(12) United States Patent
Horwitz

(10) Patent No.: US 8,220,159 B2
(45) Date of Patent: Jul. 17, 2012

(54) METALLIC FOOD SERVING DEVICE WITH A MAGNETICALLY DETACHABLE STABILIZING LEG

(76) Inventor: Warren Horwitz, Toronto (CA)

( * ) Notice: Subject to any disclaimer, the term of this patent is extended or adjusted under 35 U.S.C. 154(b) by 273 days.

(21) Appl. No.: 12/427,376

(22) Filed: Apr. 21, 2009

(65) Prior Publication Data

US 2010/0263213 A1 Oct. 21, 2010

(51) Int. Cl.
*A47J 43/00* (2006.01)
(52) U.S. Cl. .......................... 30/142; 30/114
(58) Field of Classification Search ............ 30/142–150, 30/324–328, 114, 124; D7/642, 688; 294/7
See application file for complete search history.

(56) References Cited

U.S. PATENT DOCUMENTS

| 2,457,032 | A | * | 12/1948 | Case .......................... 248/37.6 |
| 2,546,463 | A | * | 3/1951 | Lustig et al. .................... 30/327 |
| 3,877,143 | A | | 4/1975 | Montesi |
| 5,068,967 | A | * | 12/1991 | Mars .............................. 30/324 |
| 5,131,151 | A | * | 7/1992 | Agase et al. .................... 30/327 |
| 5,165,171 | A | | 11/1992 | MacLean |
| 5,600,889 | A | | 2/1997 | Marotta |
| D510,686 | S | | 10/2005 | Mounce |
| 7,044,518 | B2 | | 5/2006 | Lang et al. |
| D567,599 | S | * | 4/2008 | Kushner ......................... D7/689 |
| 2005/0011074 | A1 | | 1/2005 | Mounce |
| 2006/0021233 | A1 | * | 2/2006 | Lin ................................ 30/324 |

FOREIGN PATENT DOCUMENTS

JP 2006247243 * 9/2006

* cited by examiner

*Primary Examiner* — Stephen Choi
(74) *Attorney, Agent, or Firm* — Ruben Alcoba; Craig Kirsch

(57) ABSTRACT

A metallic food serving device with a magnetically detachable stabilizing leg comprising of a metallic food serving body having a blade member, a raised angular member and a handle member, and a magnetically detachable stabilizing leg removably attached to the handle member, whereby the magnetically detachable stabilizing leg is coplanar to the blade member. By magnetically attaching the magnetically detachable stabilizing leg to the metallic food serving body, the device is stabilized and can stand upright with or without the presence of a food product on the device. Moreover, if a user chooses to clean the device or use the device as food serving device only, the magnetically detachable stabilizing leg may be removed from the food serving body and then replaced as desired.

3 Claims, 3 Drawing Sheets

METALLIC FOOD SERVING DEVICE WITH A MAGNETICALLY DETACHABLE STABILIZING LEG

BACKGROUND

The present device relates to metallic food serving devices, specifically metallic food serving devices with magnetically detachable stabilizing legs.

Although food items such as cakes or pies might be sold as a whole unit, it is rare that such a food item is intended to be consumed by a single person. This being the case, it is a common practice to divide an entire cake or pie into several portions and serve the portions individually.

Several devices have been utilized to serve individual portions of various food products. These devices usually have a blade section and a raised handle section; however due to the uneven distribution of weight and the raised handle, these devices cannot stand upright without the food product acting as a counterbalance. Moreover, even when a food product is acting as a counterbalance, the stability of the device is questionable at best. As such, these devices do not adequately serve the multiple functions of food serving device and stable food displaying device very well.

The present device was invented to address the foregoing problem. Specifically, a metallic food serving device with a magnetically detachable stabilizing leg comprising a metallic food serving body having a blade member, a raised angular member and a handle member, and a magnetically detachable stabilizing leg removably attached to the handle member, whereby the magnetically detachable stabilizing leg is coplanar to the blade member.

By magnetically attaching the magnetically detachable stabilizing leg to the metallic food serving body, the device is stabilized and can stand upright with or without the presence of a food product on the device. Moreover, if a user chooses to clean the device or use the device as food serving device only, the magnetically detachable stabilizing leg may be removed from the food serving body and then replaced as desired.

One of the key features of the present device is the metallic composition of the food serving body, as it provides not only a non stick medium for food products, but it also is necessary to attract the magnetic stabilizing leg. Additionally, for the device to achieve a maximum level of stability the stabilizing leg must be sized and positioned such that the lower extremity of the stabilizing leg is coplanar with the food serving body. This configuration allows for the lower extremity of the stabilizing leg and the food serving body to contact a flat horizontal surface in a stable manner.

An objective of the present invention is to provide a food serving device that can be used as both a food serving device and a food displaying device.

Another objective of the present invention is to provide a food serving device having a food serving body composed of a magnetic metallic material.

Another objective of the present invention is to provide a food serving device with a magnetically detachable stabilizing leg that when attached to the food serving body, increases the stability of the device whether or not a food product is present on the food serving body.

Yet, a further objective of the present invention is to provide a food serving device with a magnetically detachable stabilizing leg that is coplanar to the food serving body.

U.S. Pat. No. 5,600,889 (hereinafter "the '889 patent") discloses a detachable lid support within a food server; however, the '889 patent does not disclose a metallic food serving device nor does it disclose a magnetically detachable support that is coplanar to a food serving body; moreover the '889 patent claims and discloses a device made of plastic.

For the foregoing reasons there exists a need for a metallic food serving device with a magnetically detachable stabilizing leg comprising of a metallic food serving body having a blade member, a raised angular member and a handle member, and a magnetically detachable stabilizing leg removably attached to the handle member whereby the magnetically detachable stabilizing leg is coplanar to the blade member.

SUMMARY

A metallic food serving device with a magnetically detachable stabilizing leg comprising of a metallic food serving body having a blade member, a raised angular member and a handle member, and a magnetically detachable stabilizing leg removably attached to the handle member, whereby the magnetically detachable stabilizing leg is coplanar to the blade member.

By magnetically attaching the magnetically detachable stabilizing leg to the metallic food serving body, the device is stabilized and can stand upright with or without the presence of a food product on the device. Moreover, if a user chooses to clean the device or use the device as food serving device only, the magnetically detachable stabilizing leg may be removed from the food serving body and then replaced as desired.

One of the key features of the present device is the metallic composition of the food serving body, as it provides not only a non stick medium for food products, but it also is necessary to attract the magnetic stabilizing leg. Additionally, for the device to achieve a maximum level of stability the stabilizing leg must be sized and positioned such that the lower extremity of the stabilizing leg is coplanar with the food serving body.

DRAWINGS

These and other features, aspects, and advantages of the present invention will become better understood with regard to the following description, appended claims and drawings where:

DESCRIPTION

Figure 1:
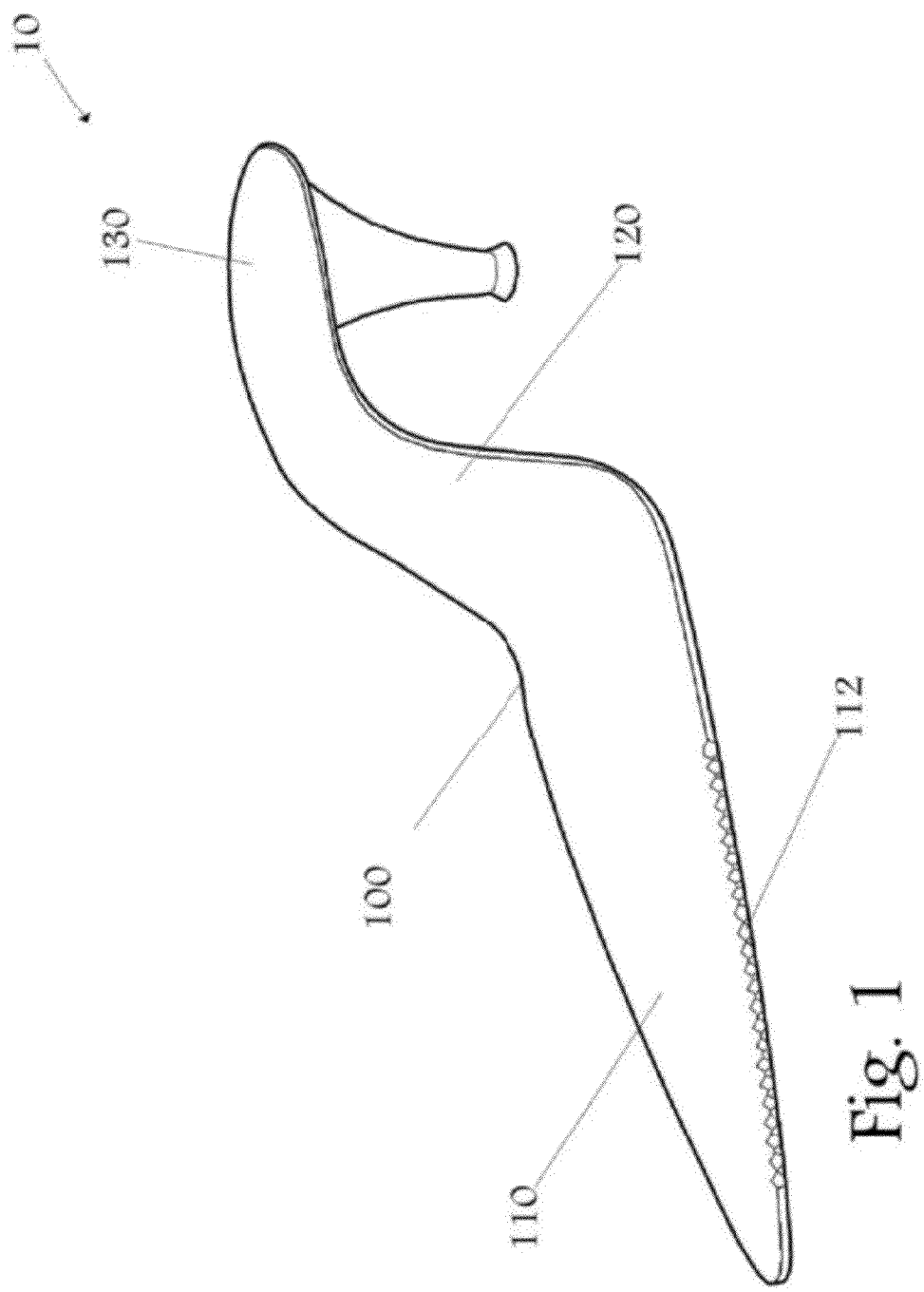
FIG. 1 shows a perspective view of one embodiment of the present device with the magnetically removable stabilizing leg attached to the food serving body.
Figure 2:
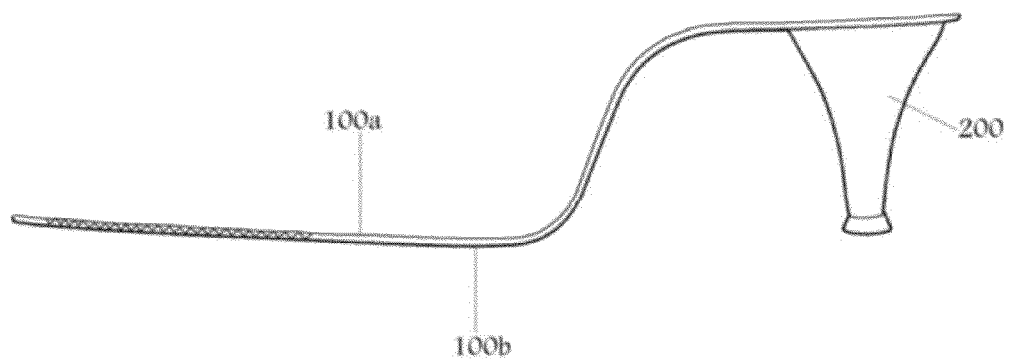
FIG. 2 shows a side elevation view of one embodiment of the present device with the magnetically removable stabilizing leg attached to the food serving body.
Figure 3:
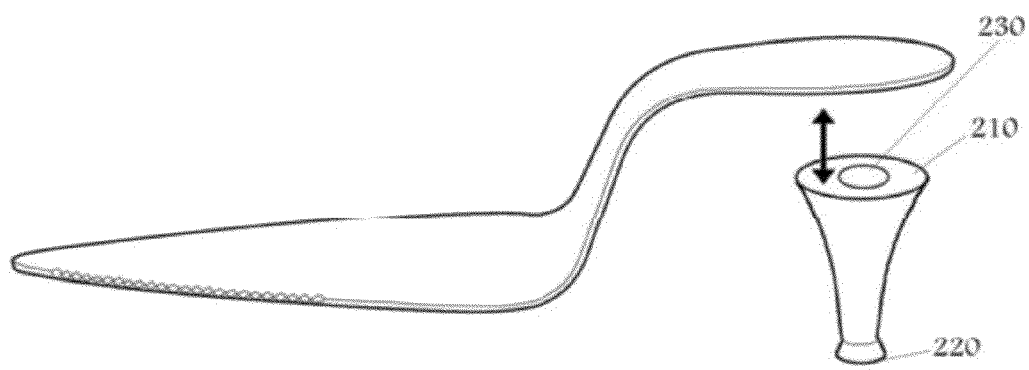
FIG. 3 shows a perspective view of one embodiment of the present device with the magnetically removable stabilizing leg detached from the food serving body.

As shown in FIG. 1-3, a metallic food serving device with a magnetically detachable stabilizing leg for assisting the serving of a food article 10, the device 10 comprises a metallic food serving body 100 and a magnetically detachable stabilizing leg 200.

The metallic food serving body 100 has a top surface 100a and a bottom surface 100b. The body 100 defines a blade member 110, a raised angular member 120 and a handle member 130. It is envisioned that the body 100 might be composed of a magnetic metal such as steel or another magnetic metal with similar characteristics. The magnetic metal composition of the food serving body 100 is an essential feature for the functionality of the device 10, as the magnetically detachable stabilizing leg 200 necessarily requires a magnetic metal to function properly. It is envisioned that the blade member 110 might further comprise at least one serrated edge 112.

The magnetically detachable stabilizing leg 200 has a top end 210 and a bottom end 220. The top end 210 of the stabilizing leg 200 comprises a fixedly attached magnet means 230 for removably attaching the stabilizing leg 200 to the handle member 130. The stabilizing leg 200 extends downward and perpendicularly from the handle member 130 so that the bottom end 220 of the stabilizing leg 200 and the bottom surface 100b of the blade member 110 are coplanar, thereby enabling the device to stand upright in a stable manner on a flat surface. It is essential that the bottom end 220 of the stabilizing leg 200 and the bottom surface 100b of the blade member 110 are coplanar in order to ensure maximum stability of the device 10. It is further envisioned that the magnetically detachable stabilizing leg 200 might be substantially cone shaped.

An advantage of the present invention is that it provides a food serving device that can be used as both a food serving device and a food displaying device.

Another advantage of the present invention is that it provides a food serving device having a food serving body composed of a magnetic metallic material.

Still another advantage of the present invention is that it provides a food serving device with a magnetically detachable stabilizing leg that when attached to the food serving body, increases the stability of the device whether or not a food product is present on the food serving body.

Yet, a further advantage of the present invention is that it provides a food serving device with a magnetically detachable stabilizing leg that is coplanar to the food serving body.

Although the present invention has been described in considerable detail with reference to certain preferred versions thereof, other versions are possible. Therefore, the spirit and the scope of the claims should not be limited to the description of the preferred versions contained herein.

What is claimed is:

1. A metallic food serving device with a magnetically detachable stabilizing leg for assisting the serving of a food article, comprising:

a metallic food serving body having a top surface and a bottom surface, the body defines a blade member, a raised angular member and a handle member, wherein the handle member is approximately one third (⅓) the length of the blade member and the raised angular member connects to the handle member at an angle of about 130°;

and a substantially cone shaped magnetically detachable stabilizing leg removably attached to the handle member, the stabilizing leg having a top end and a bottom end, wherein the diameter of the top end of the cone shaped stabilizing end is larger than the diameter of the bottom end of the cone shaped stabilizing leg the top end of the stabilizing leg comprises a fixedly attached magnet means for removably attaching the stabilizing leg to the handle member, the stabilizing leg extends downward and perpendicularly from the handle member so that the smaller diametered bottom end of the cone shaped stabilizing leg and the bottom surface of the blade member are coplanar, thereby enabling the device to stand upright on a fiat surface.

2. The device as defined in claim 1, wherein the food serving body is composed of a magnetic metal.

3. The device as defined in claim 2, wherein the magnetic metal is a metallic steel.

* * * * *